(12) United States Patent
Phelps, III et al.

(10) Patent No.: US 8,067,922 B2
(45) Date of Patent: Nov. 29, 2011

(54) UNIVERSAL BATTERY CHARGER WITH ADJUSTABLE POCKET

(75) Inventors: William C. Phelps, III, Lawrenceville, GA (US); Robert L. Vacheron, Marietta, GA (US)

(73) Assignee: Motorola Mobility, Inc., Libertyville, IL (US)

( * ) Notice: Subject to any disclaimer, the term of this patent is extended or adjusted under 35 U.S.C. 154(b) by 666 days.

(21) Appl. No.: 11/611,359

(22) Filed: Dec. 15, 2006

(65) Prior Publication Data

US 2008/0143294 A1   Jun. 19, 2008

(51) Int. Cl.
*H02J 7/00* (2006.01)
*H02J 7/04* (2006.01)
(52) U.S. Cl. ......... 320/110; 320/107; 320/112; 320/113
(58) Field of Classification Search .................. 320/107, 320/110, 113, 112, 111, 114, 115
See application file for complete search history.

(56) References Cited

U.S. PATENT DOCUMENTS

| 4,101,818 | A |   | 7/1978  | Kelly, III et al. |         |
|-----------|---|---|---------|-------------------|---------|
| 4,766,361 | A | * | 8/1988  | Pusateri          | 320/110 |
| 5,287,052 | A | * | 2/1994  | Wang              | 320/110 |
| 5,357,185 | A | * | 10/1994 | Chen              | 320/110 |
| 5,606,238 | A | * | 2/1997  | Spellman et al.   | 320/110 |
| D397,084  | S |   | 8/1998  | Siddoway          |         |
| 6,348,776 | B2| * | 2/2002  | Kim               | 320/110 |
| 6,610,941 | B2|   | 8/2003  | Pfeiffer          |         |
| 6,690,141 | B1|   | 2/2004  | Yu                |         |
| 6,869,299 | B2| * | 3/2005  | Tanaka et al.     | 439/188 |
| 7,187,156 | B2| * | 3/2007  | Nakasho et al.    | 320/107 |
| 2001/0015634 | A1 | * | 8/2001 | Shirakawa      | 320/110 |
| 2002/0063550 | A1 | * | 5/2002 | Chen et al.    | 320/110 |
| 2003/0085686 | A1 | * | 5/2003 | Haga et al.    | 320/112 |
| 2006/0255763 | A1 | * | 11/2006| Lung Tong      | 320/110 |
| 2010/0171462 | A1 | * | 7/2010 | Yang           | 320/110 |

* cited by examiner

*Primary Examiner* — Edward Tso
*Assistant Examiner* — Alexis Boateng

(57) ABSTRACT

A universal battery charger having an adjustable pocket for receiving batteries having differing dimensions. Each battery, regardless of their differing dimensions, may be firmly supported within the adjustable pocket and receive an electrical charge from a single set of electrical contacts exposed in the adjustable pocket. The adjustable pocket is adjustable, because a battery guide of the charger includes first and second ends that alternately protrude through the plane of the housing, thus providing different dynamic supporting walls for different batteries. The adjustable pocket may accommodate different batteries by utilizing different receiving areas of the pocket. One receiving area may supports one side of a first battery with a first dynamic wall and supports other sides of the first battery with stationary walls. Likewise, another receiving area may support one side of a second battery with a second dynamic wall and supports other sides of the second battery with stationary walls.

7 Claims, 3 Drawing Sheets

UNIVERSAL BATTERY CHARGER WITH ADJUSTABLE POCKET

FIELD OF THE INVENTION

The present invention relates generally to the field of accessories for charging batteries of portable electronic devices. More particularly, the present invention relates to a battery charger having an adjustable pocket for receiving batteries having differing dimensions.

BACKGROUND OF THE INVENTION

Portable electronic devices receive their portable power from rechargeable batteries, which come in different form factors, i.e., differing sizes and shapes. Battery chargers are often used to energize and re-energize the rechargeable batteries when a battery is not fully charged. The varying form factors of the rechargeable batteries create a problem for users or groups of users utilizing rechargeable batteries having different sizes and/or shapes. With different form factors, each rechargeable battery requires a differently-shaped pocket for receiving the battery. For example, to address this problem for the users, an accessory manufacturer who makes battery chargers must make different battery chargers for each rechargeable battery. In the alternative, the accessory manufacturer may make a single battery charger having multiple pockets in which each pocket is specifically configured for receiving the form factor of a particular battery.

There is, thus, a need for an improved battery charger having adjustability for accommodating rechargeable batteries having differing form factors. The battery charger should include a single pocket for receiving multiple form factors in order to maximize use of space and minimize the overall size of the battery charger. The battery charger should also include a simple and effective mechanism for adjusting the single pocket of the charger so that users may adjust the pocket quickly with minimal effort. The battery charger should further provide a simple and efficient mechanism for insertion and removal of each battery to and from the pocket. In addition, it would be desirable to utilize a single set of contacts for multiple configurations in order to minimize the complexity and cost of manufacturing and utilizing the battery charger.

DETAILED DESCRIPTION OF THE EMBODIMENTS

Figure 1:
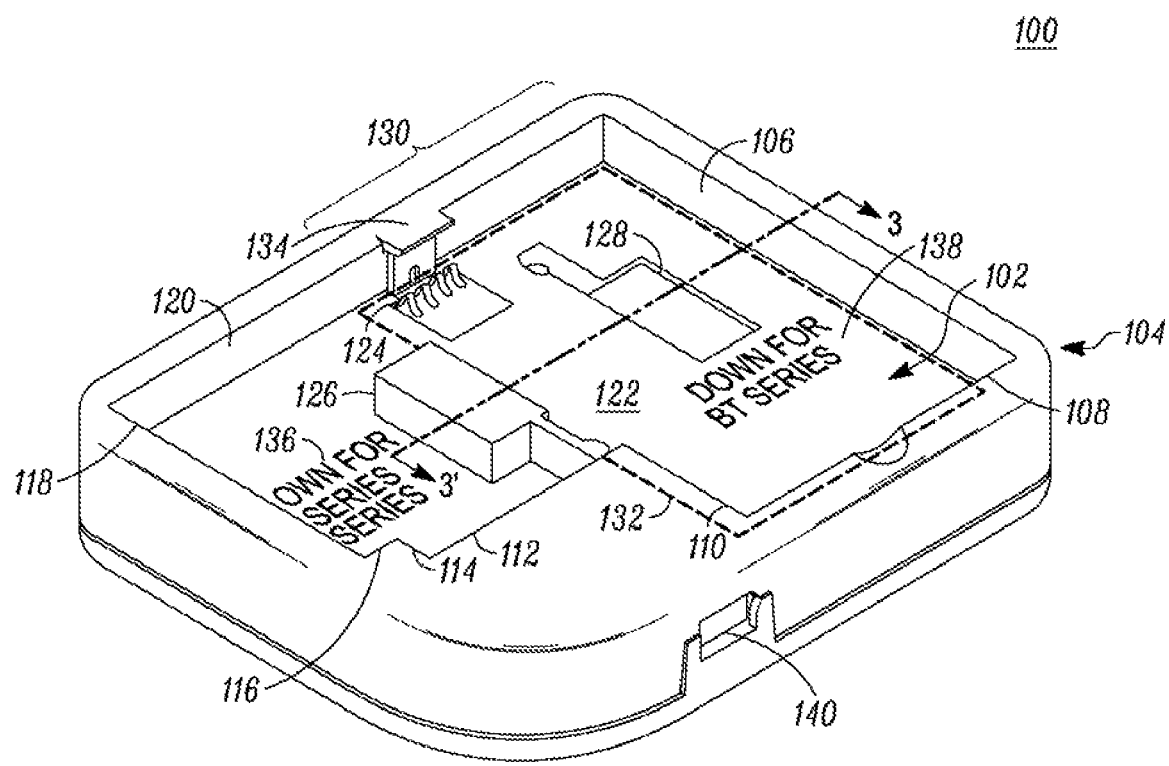
FIG. 1 is a perspective view of a preferred embodiment in accordance with the present invention, in which a battery guide is set at a first position.

The present invention is a battery charger having an adjustable pocket for accommodating rechargeable batteries of varying sizes and shapes. The battery charger utilizes a single pocket for receiving multiple form factors in order to maximize use of space and minimize the overall size of the battery charger. Thus, the pocket of the battery charger is larger than the form factor of any single battery, but the pocket can securely receive batteries having different form factors, one-at-at time, by situating each battery at a different position within the pocket. In other words, the pocket is partitioned into multiple receiving areas which overlap with each other, so that each battery having a unique form factor may be situated in the pocket for recharging.

In order to provide adjustability and ensure a secure fit for each form factor, the battery charger also includes a battery guide to provide lateral support to one or more sides of each battery situated in the pocket of the battery charger. The battery guide provides quick and simple method for changing the boundaries defining a receiving area for receiving each battery. In particular, battery guide changes the position of two or more support blocks, which provide lateral support to each type of battery, in response to a single actuation by the user, such as the single finger or thumb force.

One aspect of the universal battery charger in accordance with the present invention is an adjustable pocket for receiving batteries having differing dimensions. The charger comprises a housing, a plurality of electrical contacts, and a battery guide. The housing has a plurality of sides defining an enclosed boundary of the adjustable pocket, a plane defined by the boundary and orthogonal to the plurality of sides, and an inner compartment bounded on one side by the plane. The plurality of electrical contacts are exposed at the plane within the boundary of the adjustable pocket. The electrical contacts are capable of providing an electrical charge to conductive elements in contact with the electrical contacts. The battery guide is supported by the inner compartment of the housing. The battery guide includes first and second ends that alternately protrude through the plane of the housing.

Another aspect of the universal battery charger is that the charger comprises an adjustable pocket having an enclosed boundary, a plurality of electrical contacts exposed within the boundary of the adjustable pocket, a first receiving area of the adjustable pocket and a second receiving area of the adjustable pocket. Both receiving areas are less than the enclosed boundary, expose the plurality of electrical contacts, and are different from each other. The first receiving area supports one side of a first battery with a first dynamic wall and supports at least two remaining sides of the first battery with stationary walls. The second receiving area supports one side of a second battery with a second dynamic wall and supports at least two remaining sides of the second battery with at least two stationary walls.

Referring to FIG. 1, there is shown an exemplary universal battery charger 100 in accordance with the present invention. The battery charger 100 comprises an adjustable, multi-battery charge pocket 102 for receiving batteries having differing dimensions. For the embodiment shown in FIG. 1, the battery charger 100 comprises a housing 104 having multiple sides or stationary walls 106, 108, 110, 112, 114, 116, 118, 120 defining an enclosed boundary of the adjustable pocket 102. Also, for this embodiment, the battery charger 100 comprises a plane or pocket bottom 122 recessed from the top of the housing 104 defined by the boundary and orthogonal to a lower portion of the multiple sides 106-120.

The battery charger 100 further comprises electrical contacts or charger connector 124 exposed at the plane 122 within the boundary of the adjustable pocket 102. The electrical contacts 124 are capable of providing an electrical charge to conductive elements in contact with the electrical contacts, such as electrical contacts of a battery. It should be noted that, for the embodiment shown in FIG. 1, the battery charger 100 includes only one set of electrical contacts 124 grouped together at a single location of the plane 122. Thus, regardless of the type or form factor of the battery situated in the pocket 102, each battery is positioned in the pocket so that the electrical contacts of battery will be in electrical contact with the electrical contacts of the battery charger 100. This is true even though each battery has a different position within the pocket 102. The design and cost of manufacturing the battery charger 100 is partially minimized by having only one set of electrical contacts 124 exposed at the plane 122.

The battery charger 100 still further comprises a battery guide supported by an inner compartment of the housing 104, which is explained in more detail with regard to FIG. 3 below. The battery guide includes first and second ends or dynamic walls 126, 128 that alternately protrude through the plane 122 of the housing 104. For example, as shown in FIG. 1, the first end 126 extends up from, and protrudes above, the plane 122 whereas the second end 128 extends down from, and recesses below, the plane. By protruding through and above the plane 122 of the housing 104, the first end 126 provides lateral support to one or more sides of each battery situated in the pocket of the battery charger in conjunction with sides 106, 108, 110 and partial section 130 of side 120. For example, when the first end 126 protrudes above the plane 122, as shown in FIG. 1, the first end effectively partitions the pocket 102 to form a first receiving area 132 for receiving a rechargeable battery having particular dimensions.

The battery charger 100 may yet further comprise other components to enhance the operation of the charger by a user. In particular, the battery charger 100 may comprise a support tab 134, molded text(s) 136, 138 and/or a power supply connector 140. The support tab 134 is a second planar surface, orthogonal to the side 120 of the pocket, positioned opposite the electrical contacts 124. The first and second molded text 136 and 138 are associated with first and second ends 126, 128, respectively, and provide guidance to the user for operation of the battery guide. For example, the first molded text associated with, and adjacent to, the first end 126 may indicate that the first end may be actuated for a first type of rechargeable battery, such as "DOWN FOR A SERIES", and the second molded text associated with, and adjacent to, the second end 128 may indicate that the second end may be actuated for a second type of rechargeable battery, such as "DOWN FOR B SERIES". The power supply connector 140 may receiving a cable (not shown) for coupling the internal electronics of the battery charger to an external power source, such as an electrical outlet, an electrical transformer, a battery source, or a device that receives power from another power source.

Figure 2:
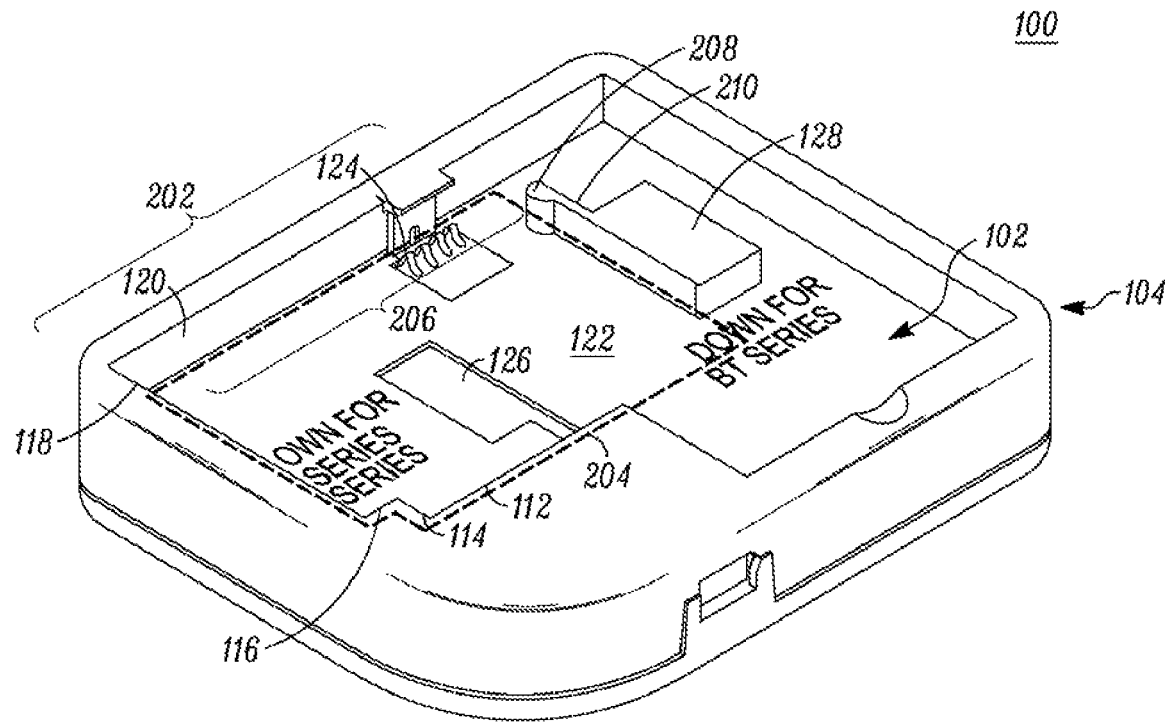
FIG. 2 is another perspective view of the preferred embodiment of FIG. 1, in which the battery guide is set at a second position.

Referring to FIG. 2, there is shown another view of the battery charger, in which the battery guide is set at a different position. As stated above, the battery charger 100 comprises the battery guide, which includes the first and second ends 126, 128 that alternately protrude through the plane 122 of the housing 104. In contrast to FIG. 1, the embodiment shown in FIG. 2 presents the first end 126 extending downward from, and recesses below, the plane 122 whereas the second end 128 extends upward from, and protrudes below, the plane. Thus, when a user actuates or presses down on first end 126, the battery guide redirects the user's force at the top of the first end to bottom of the second end 128 so that the second end pops-up above the plane 122. Likewise, when the user actuates or presses down on the second end 128, the battery guide redirects the user's force to at the top of the second end to the bottom of the first end 126 so that the first end pops-up above the plane 122.

By protruding through and above the plane 122 of the housing 104, the second end 128 provides lateral support to one or more sides of each battery situated in the pocket of the battery charger in conjunction with sides 112, 114, 116, 118 and partial section 202 of side 120. For example, when the second end 128 protrudes above the plane 122, as shown in FIG. 2, the second end effectively partitions the pocket 102 to form another receiving area 204 for receiving one or more rechargeable batteries, each having particular dimensions. For the embodiment shown in FIG. 2, sides 114 and 116 at one corner area of the receiving area 204 provides the opportunity to support batteries of different dimensions within the receiving area and, thus, the receiving area is actually second and third receiving areas of the pocket 102. For the second receiving area, sides 116, 118 and partial section 202 of side 120 work in conjunction with the second end 128 to support a second type of rechargeable battery. For the third receiving area, sides 112, 114 and partial section 206 of side 120 work in conjunction with the second end 128 to support a third type of rechargeable battery.

The battery guide may provide the added function of facilitating the ejection or removal of each battery from the pocket of the battery charger. As stated above, the battery guide redirects the user's actuation force at the top of the first end 126 to bottom of the second end 128 so that the second end pops-up above the plane 122 and, likewise, redirects the user's actuation force to at the top of the second end to the bottom of the first end 126 so that the first end pops-up above the plane 122. Accordingly, the upward forces of the first and second ends 126, 128, when they pop-up, may cause the rechargeable battery positioned above to be exerted upward and unseated from the pocket 102. For example, when a rechargeable battery is positioned in the receiving area 204 of FIG. 2, the first end 126 is positioned directly under the battery and the second end 128 is exposed adjacent to the battery. When a user presses down on the second end 128, this actuation force will cause the first end 126 to move upward and eject the battery from the receiving area. Likewise, in reference to FIG. 1, when a rechargeable battery is positioned in the first receiving area 132 such that the second end 128 is positioned directly under the battery and the first end 126 is exposed adjacent to the batter, a downward force on the first end will cause the second end to move upward and eject the battery form the first receiving area.

As shown in FIGS. 1 and 2, each of the first and second ends 126, 128 may include various parts to securely support rechargeable batteries in the pocket 102. For example, the first and second ends 126, 128 may include an interference bump 208 that is capable of adjusting upon contact with a battery to securely maintain the battery in the adjustable pocket. The first and second ends 126, 128 may also includes a beam 210 that supports the interference bump 208 to other parts of the battery guide and is capable of flexing backward to absorb tolerance of the battery upon contact to the interference bump. The interference bump 208 on the battery guide accounts for battery tolerance, and the beam 208 on the battery guide flexes backward to absorb tolerance of the battery to ensure a tight fit.

In addition, a single set of electrical contacts 124 is provided to minimize the complexity and cost of manufacturing and utilizing the battery charger 100. To enable the battery charger 100 to operate with multiple form factors or dimensions of batteries, the electrical contacts must be located within some portion of each receiving area, such as the first receiving area 132 and the second and third receiving areas 204. Accordingly, the electrical contacts are located within an overlapping region of the multiple receiving areas within the pocket 102. In addition, the electrical contacts may be located in a region generally located between the first and second ends 126, 128, as shown in FIGS. 1 and 2.

Figure 3:
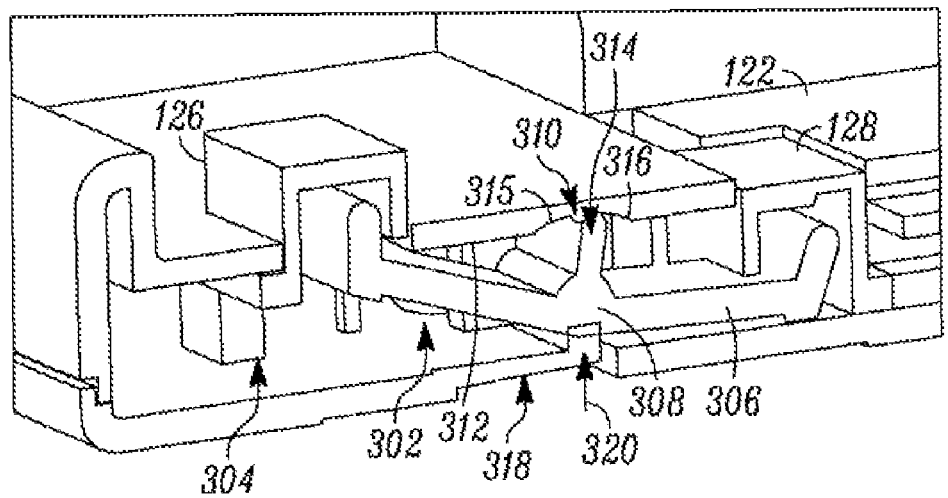
FIG. 3 is a cut-away view of section 3-3' of FIG. 1, representing a more detailed view of the battery guide.

Referring to FIG. 3, there is shown a cut-away portion 300 at section 3-3' of the battery charger 100, which represents a more detailed view of the battery guide 302. The battery guide is located within an inner compartment 304 bounded on one side by, and located below, the plane 122. The battery charger also includes an electrical circuit supported by the inner compartment 304 of the housing 104, in which the electrical circuit is coupled to the electrical contacts 124 to provide the electrical charge and operative to connect to an external power source.

The battery guide 302 includes a guide body 306 having a guide pivot 308 about which the first and second ends 126, 128 rotate. For example, for the embodiment shown by FIG. 3, the battery guide 302 may pivot between a first position in which the first end 126 protrudes through the plane 122 of the housing 104 and the second end 128 recesses into the inner compartment 304 (shown in FIG. 3), and a second position in which the first end recesses into the inner compartment and the second end protrudes through the plane of the housing. In addition, for one embodiment, the battery guide may be directed to the first and second positions. The plane 122 of the housing 104 may include a detent 310 molded on an inner surface 312 of the plane 122, and the battery guide 302 may include a locking tab 314 extending toward the detent 310 of the plane 122. For this embodiment, the locking tab 314 may transition over the detent 310 when the battery guide 302 moves between the first and second positions, thus directing the battery guide to one of these two positions. Indentions 315, 316 may be provided on either side of the detent 310 in order to provide mechanisms for locking the battery guide 302 at the first and second positions. For another embodiment, the inner compartment 304 may includes a spring mechanism 318 that provides a force 320 against the guide pivot 308 of the battery guide 302, and maintains the locking tab 314 against the detent 310 and areas of the inner surface 312 of the plane 122 about the detent, i.e., indentions 315, 316. For example, as shown in FIG. 3, the spring mechanism may be a molded portion of the housing 104 situated directly below the guide pivot 308 of the battery guide 302.

Figure 4:
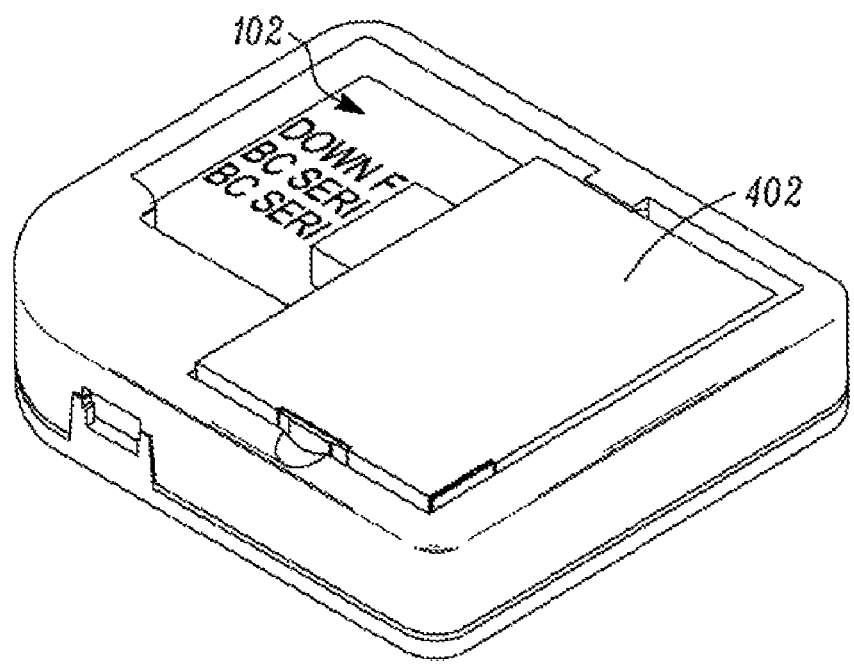
FIG. 4 is a perspective view of a first type of battery situated in the preferred embodiment of FIG. 1.
Figure 5:
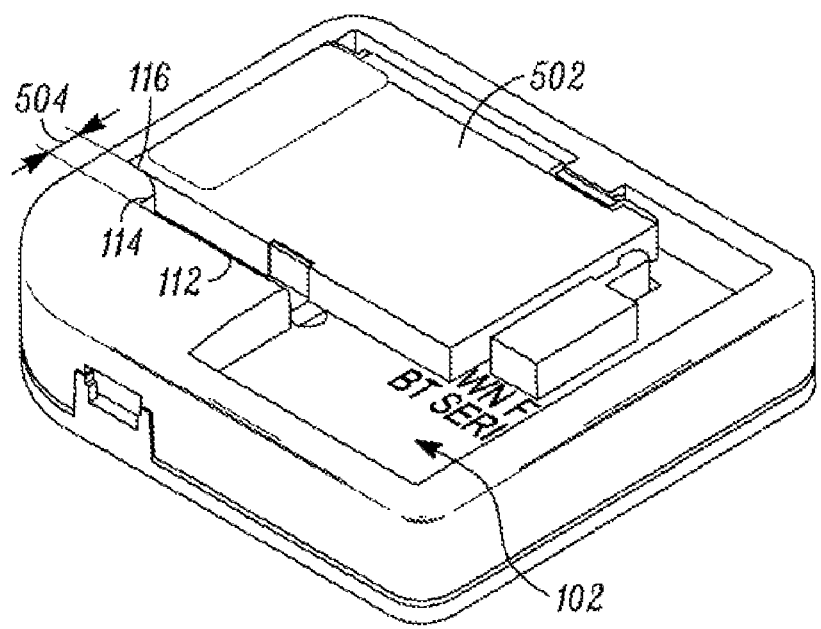
FIG. 5 is a perspective view of a second type of battery situated in the preferred embodiment of FIG. 2.
Figure 6:
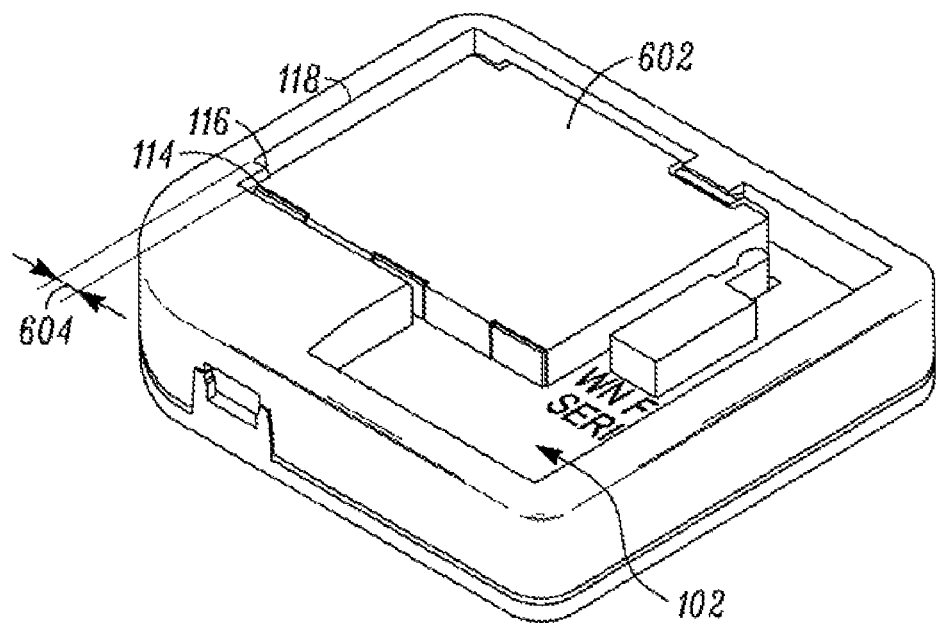
FIG. 6 is another perspective view of a third type of battery situated in the preferred embodiment of FIG. 2.

Referring to FIGS. 4 through 6, there are shown multiple views of the battery charger 100 in which various types of rechargeable batteries are situated in differing receiving areas of the pocket 102 of the battery charger. In particular, FIG. 6 shows a first type of battery 402 situated at a first receiving area 132, FIG. 5 shows a second type of battery 502 situated at a second receiving area, and FIG. 6 shows a third type of battery 602 situated at a third receiving area. Thus, it can be seen that the particular embodiment illustrated by FIGS. 1 through 6 is capable of supporting at least three different types of batteries 402, 502, 602 in the pocket 102, which only has a single set of electrical contacts 124. The battery guide 302 is capable of adjusting the pocket 102 into two different, but overlapping, partitions by alternately protruding its first and second ends 126, 128 through the plane 122 of the housing 104. The battery charger 100 is further capable of accommodating batteries of differing dimension within a single receiving area 204 of the pocket 102, by incorporating sides 114 and 116 at one corner area of the receiving area, thus further splitting the receiving area into second and third receiving areas of the pocket 102. For example, as shown in FIG. 5, a gap 504 exists between a lateral side of the second type of battery 502 and one stationary side 112 of the pocket 102, but the battery is securely positioned in the pocket because another stationary side 116 provides adequate support for the lateral side of the battery. For another example, as shown in FIG. 6, a gap 604 exists between a lateral side of the third type of battery 602 and one stationary side 118 of the pocket 102, but the battery is securely positioned in the pocket because another stationary side 114 provides adequate support for the lateral side of the battery. Accordingly, the battery charger 100 is capable of supporting and charging rechargeable batteries of varying dimensions.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A universal battery charger with an adjustable pocket for receiving batteries having differing dimensions, the charger comprising:

a housing having a plurality of sides defining an enclosed boundary of the adjustable pocket, a plane defined by the boundary and orthogonal to the plurality of sides, and an inner compartment bounded on one side by the plane opposite the adjustable pocket;

a plurality of electrical contacts exposed at the plane within the boundary of the adjustable pocket, the electrical contacts being capable of providing an electrical charge to conductive elements in contact with the electrical contacts; and a battery guide supported by the inner compartment of the housing, the battery guide including first and second ends that alternately protrude through the plane of the housing, wherein the first end protrudes through the plane of the housing and the second end recedes into the inner compartment when the battery guide is at its first position, and the second end protrudes through the plane of the housing and the first end recedes into the inner compartment when the battery guide is at its second position.

2. The universal battery charger of claim 1, wherein each of the first and second ends includes an interference bump that is capable of adjusting upon contact with a battery to securely maintain the battery in the adjustable pocket.

3. The universal battery charger of claim 2, wherein each of the first and second ends further includes a beam that supports the interference bump to other parts of the battery guide and is capable of flexing backward to absorb tolerance of the battery upon contact to the interference bump.

4. The universal battery charger of claim 1, wherein:
the battery guide includes a guide body having a guide pivot about which the first and second ends rotate, the battery guide having at least first and second positions.

5. The universal battery charger of claim 4, wherein:
the plane includes a detent molded on an inner surface of the plane;
the battery guide includes a locking tab extending toward the detent of the plane, the locking tab transitions over the detent when the battery guide moves between the first and second positions.

6. The universal battery charger of claim 5, wherein:
the inner compartment includes a spring mechanism that provides a force against the guide pivot of the battery guide, and maintains the locking tab against the detent and areas of the inner surface of the plane about the detent.

7. The universal battery charger of claim 1, further comprising an electrical circuit supported by the inner compartment of the housing, the electrical circuit being coupled to the plurality of electrical contacts to provide the electrical charge and operative to connect to an external power source.

* * * * *